United States Patent

Erickson et al.

[11] Patent Number: 6,029,703
[45] Date of Patent: Feb. 29, 2000

[54] PRESSURE SOLENOID CONTROL VALVE WITH FLUX SHUNT

[75] Inventors: Bradley C. Erickson, Clarkston; Garrett R. Holmes, Ortonville, both of Mich.

[73] Assignee: Borg-Warner Automotive, Inc., Troy, Mich.

[21] Appl. No.: 09/216,135

[22] Filed: Dec. 18, 1998

[51] Int. Cl.⁷ .......................... F15B 13/043; F16K 31/06
[52] U.S. Cl. ................. 137/625.61; 137/625.64; 251/129.15; 251/129.17; 251/129.18
[58] Field of Search .......... 137/625.61, 625.64, 137/625.65; 251/129.15, 129.17, 129.18

[56] References Cited

U.S. PATENT DOCUMENTS

| | | | |
|---|---|---|---|
| 4,250,922 | 2/1981 | Will et al. ................. | 251/129.15 X |
| 4,346,847 | 8/1982 | Rissi . | |
| 4,535,816 | 8/1985 | Feder et al. ............... | 137/625.65 |
| 4,810,985 | 3/1989 | Mesenich . | |
| 4,836,248 | 6/1989 | Stegmaier . | |
| 4,947,893 | 8/1990 | Miller et al. . | |
| 4,966,195 | 10/1990 | McCabe .................... | 137/625.64 X |
| 5,036,885 | 8/1991 | Miura ....................... | 137/625.65 |
| 5,127,624 | 7/1992 | Domke . | |
| 5,163,654 | 11/1992 | Borsatti et al. . | |
| 5,184,644 | 2/1993 | Wade ........................ | 137/625.64 |
| 5,277,399 | 1/1994 | McCabe . | |
| 5,460,146 | 10/1995 | Frankenberg . | |
| 5,467,962 | 11/1995 | Bircann et al. . | |
| 5,513,673 | 5/1996 | Slavin et al. ............... | 137/625.65 |
| 5,513,832 | 5/1996 | Becker et al. .............. | 251/129.18 |
| 5,558,311 | 9/1996 | Connolly et al. . | |
| 5,577,534 | 11/1996 | Ward ........................ | 137/625.65 X |
| 5,593,133 | 1/1997 | Hunnicutt . | |
| 5,626,327 | 5/1997 | Clark . | |
| 5,707,039 | 1/1998 | Hamilton et al. .......... | 251/129.17 |
| 5,853,028 | 12/1998 | Ness et al. ................ | 137/625.65 |
| 5,878,782 | 3/1999 | Nakajima .................. | 137/625.65 |
| 5,897,098 | 4/1999 | Nishinosono et al. ...... | 251/129.08 |
| 5,899,436 | 5/1999 | Holmes et al. ............ | 251/129.15 |

FOREIGN PATENT DOCUMENTS

| | | | |
|---|---|---|---|
| 2-142984 | 6/1990 | Japan ........................ | 137/625.65 |

*Primary Examiner*—Gerald A. Michalsky
*Attorney, Agent, or Firm*—Harness, Dickey & Pierce; Greg Dzielewski

[57] ABSTRACT

A solenoid control valve (10) that includes an electromagnetic coil (30) positioned within a housing (16) and a spool valve (72) positioned within a central bore (70) of a valve body (20). An armature (40) is axially positioned within the coil (30) and an armature spring (52) biases the armature (40) against an opening in the central bore (70) when the coil (30) is not energized. The spool valve (72) includes an internal chamber and a pair of sealing lands (98,100) that selectively seal a supply port (92) and a control port (94) within the valve body (20). A pole piece (26), including an annular flux shunt portion (62), is threadably engaged with the housing (16) to control a working air gap (60) between the pole piece (26) and the armature (40). The flux shunt portion (62) more radially directs the electromagnetic field lines to weaken the magnetic force as the armature (40) moves closer to the pole piece (26). A deep drawn flux tube (64) is positioned within the housing (16), and the flux tube (64) and the housing (16) are attached to the valve body (20) by a crimped connection (22) at a common location.

15 Claims, 2 Drawing Sheets

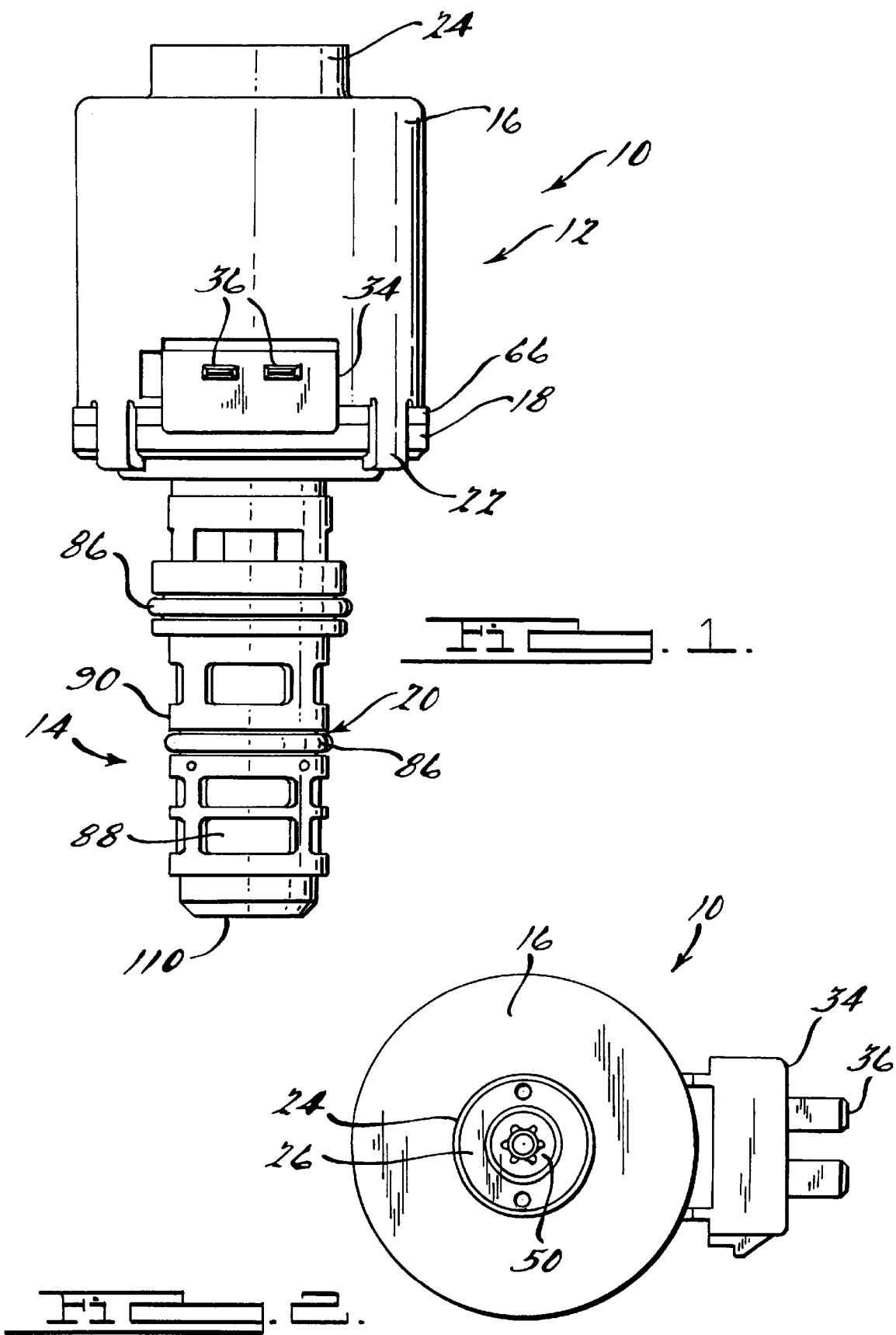

PRESSURE SOLENOID CONTROL VALVE WITH FLUX SHUNT

BACKGROUND OF THE INVENTION

1. Field of the Invention

This invention relates generally to a fluid control valve and, more particularly, to a proportional, variable force solenoid control valve that includes improvements over existing control valves, such as a flux shunt pole piece and a specialized crimped housing.

2. Discussion of the Related Art

Modern vehicles generally employ an automatic transmission controller that includes several solenoid operated fluid control valves that independently act to control the pressure of the transmission fluid in the vehicle's transmission to operate various components of the transmission. For example, solenoid operated fluid control valves are known that use transmission fluid pressure to engage and disengage the transmission clutch in response to an electrical input signal supplied to the solenoid. One particular type of solenoid control valve is referred to as a variable force solenoid control valve. Typically, variable force solenoid control valves comprise fluid control components including a spool valve having a stem and two radially extending lobes or lands. The spool valve is movably confined within a valve body to create flow restrictions for pressure regulation. Fluid passages are provided in the valve body which communicate with the various surfaces of the spool valve. Fluid at an inlet pressure is delivered to a flow restriction provided between the two spool valve lands. The flow restriction enables the fluid pressure to be reduced to a desired outlet control pressure.

U.S. Pat. No. 5,277,399 issued to McCabe discloses a solenoid operated fluid control valve for use in a control system of an automatic transmission of a vehicle. The control valve includes an electromagnetic coil positioned within a housing and a spool valve positioned within a valve body. An armature is axially positioned within the coil and an armature spring biases the armature towards the spool valve when the coil is not energized. The spool valve includes an internal chamber and a series of sealing lands that selectively seal a supply port and a control port within the valve body. A pole piece is threadably engaged within the housing, and controls a working air gap between the pole piece and the armature. By energizing the coil, the pressure within the bore and the valve body is controlled.

Although the variable force solenoid control valves known in the prior art have generally been successful in meeting the demands of the industry, these control valves can be further improved upon. As the controllers become more sophisticated, it is necessary that the solenoid operated control valves also include advancements and improvements over the state of the art. In this regard, it becomes important to increase the operating efficiency, reduce the cost, reduce the weight, reduce the complexity, etc. of the existing control valves. Therefore, advancements in size, part reduction, component simplification, etc. of the known control valves is advantageous.

It is an object of the present invention to provide an improved variable force control valve for use in an automatic controller.

SUMMARY OF THE INVENTION

In accordance with the teachings of the present invention, a solenoid control valve is disclosed that includes an electromagnetic coil positioned within a housing and a spool valve positioned within a central bore of a valve body. An armature is axially positioned within the coil and an armature spring biases the armature against an opening in the central bore when the coil is not energized. The spool valve includes an internal chamber and a pair of sealing lands that selectively seal a supply port and a control port within the valve body. A pole piece, including an annular flux shunt portion, is threadably engaged with the housing to control a working air gap between the pole piece and the armature. The flux shut portion more radially directs the electromagnetic field lines to weaken the magnetic force as the armature moves closer to the pole piece. A deep drawn flux tube is positioned within the housing, and the flux tube and the housing are attached to the valve body by a crimped connection at a common location.

Additional objects, advantages and features of the present invention will become apparent from the following description and appended claims, taken in conjunction with the accompanying drawings.

BRIEF DESCRIPTION OF THE DRAWINGS

FIG. 1 is an elevation view of a variable force solenoid control valve according to an embodiment of the present invention;

FIG. 2 is a top view of the solenoid control valve shown in FIG. 1; and

DETAILED DESCRIPTION OF THE PREFERRED EMBODIMENTS

Figure 3:
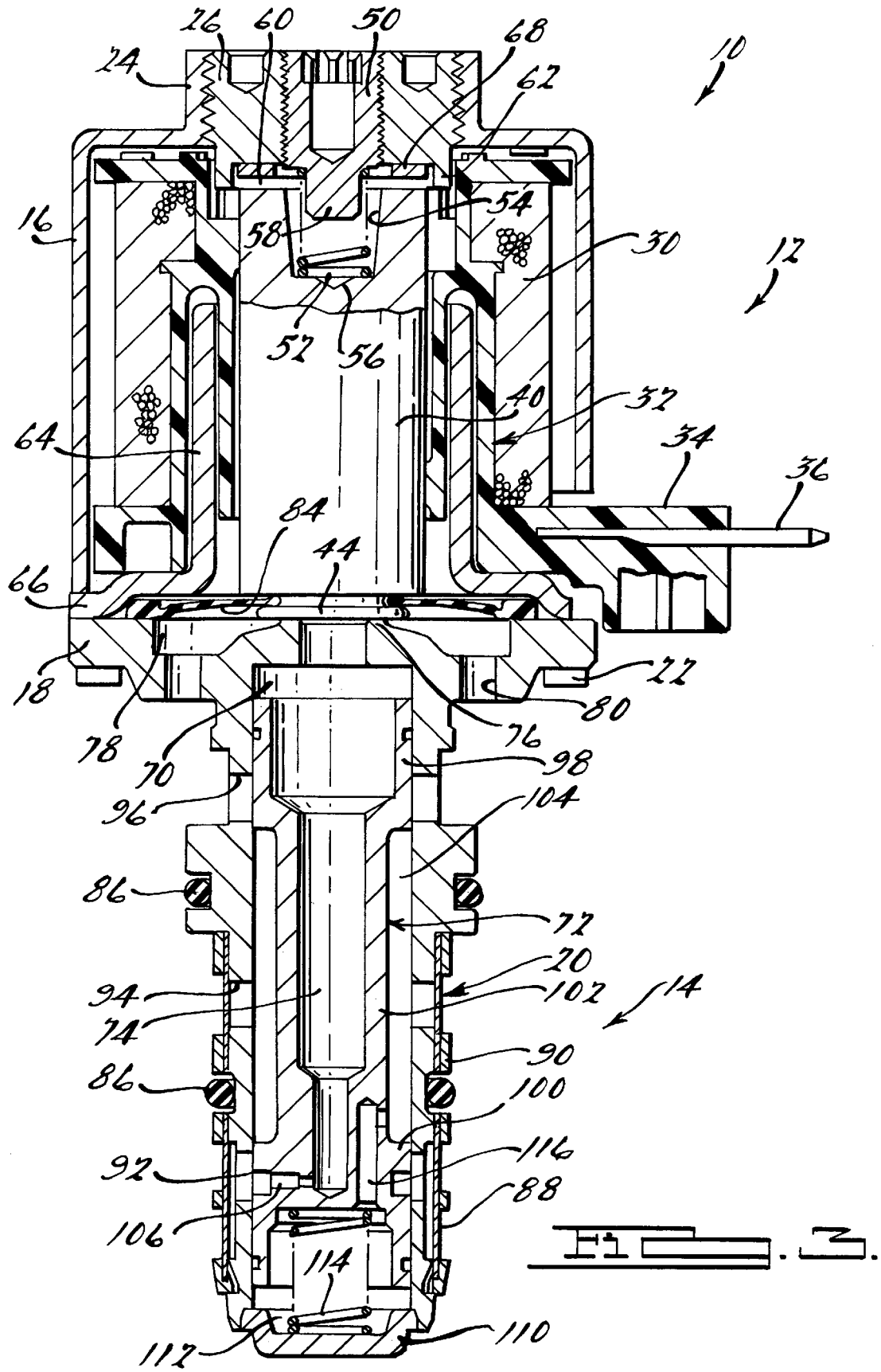
FIG. 3 is a cross-sectional view of the solenoid control valve shown in FIG. 1.

The following discussion of the preferred embodiments directed to a variable force solenoid control valve is merely exemplary in nature and is in no way intended to limit the invention or its applications or uses.

FIG. 1 shows an elevational view, FIG. 2 is a top view, and FIG. 3 is a cross-sectional view of a variable force solenoid control valve 10, according to an embodiment of the present invention. In one embodiment, the solenoid control valve 10 is a fluid control valve employed as a regulator for the engagement and disengagement of the transmission gearing in an automatic transmission (not shown) of a vehicle. The use of a variable force control valve as a pressure regulator in an automatic transmission is known in the art. Therefore, the specific hydraulic connections, source pressures and control pressures used in association with the control valve 10 will not be shown or described below, as these things form no part of the present invention, and are well know to those skilled in the art. The internal components of the control valve 10 make up the invention, and will be discussed in detail below. As will be appreciated by those skilled in the art, the control valve 10 of the invention is not limited for use in an automatic transmission of a vehicle, but has a much broader use in any control device that may use a solenoid valve of the type described herein.

The control valve 10 is separated into a magnetic portion 12 and a hydraulic portion 14. The magnetic portion 12 includes an outer housing or can 16 that encloses the magnetic components of the valve 10. The can 16 is made of a suitable magnetic material, such as steel. The can 16 is attached to an annular mounting portion 18 of a valve body 20 in the hydraulic portion 14 by crimping a series of tabs 22 to the mounting portion 18, where the tabs 22 are bent under the mounting portion 18. An upwardly extended annular rim 24 of the can 16 supports a magnetic pole piece 26 mounted to the can 16, as shown. In one embodiment, the pole piece 26 is threadably engaged to the extended rim 24 to be adjustably positionable within the can 16 for reasons that will become apparent from the discussion below. Of course, the pole piece 26 can be mounted to the can 16 by any suitable technique.

The magnetic portion 12 further includes a coil 30 wound on a non-magnetic bobbin 32 and coaxially positioned within the can 16 as shown. The bobbin 32 is a plastic member that is molded to have the configuration as shown to conform to the components within the magnetic portion 12. A terminal housing 34 is secured to an outside surface of the can 16 by a press fit engagement or the like. The terminal housing 34 includes a pair of terminal contacts 36 that extend into the can 16 and are supported within the bobbin 32. The terminal contacts 36 provide an electrical connection to energize the coil 30. Of course, any suitable terminal connection for providing power to the coil 30 can be used within the scope of the present invention.

A cylindrical shaped armature 40 is coaxially positioned at the center of the can 16, and is nearly completely surrounded by the bobbin 32 so that an inside surface of the bobbin 32 acts as a bearing surface when the armature 40 moves up and down within the can 16. In one embodiment, the armature 40 is made of a magnetic powdered metal to receive the magnetic flux lines created by the coil 30 when it is energized. However, as will be appreciated by those skilled in the art, the armature 40 can be made of any suitable magnetic material. The armature 40 includes an extended seal member 44 at its lower end. An armature spring 52 is positioned within a bore 54 extending through the top end of the armature 40. One end of the spring 52 rests against a bottom wall 56 of the bore 54, and an opposite end of the spring 52 is mounted on a centering piece 58 extending from a threaded member 50 threadably engaged within the pole piece 26. The armature spring 52 applies a bias against the armature 40 towards the magnetic portion 14. The threaded member 50 can be threadably adjusted relative to the pole piece 26 to adjust the bias force applied by the spring 52 to the armature 40.

A working air gap 60 is defined between a bottom surface of the pole piece 26 and the top end of the armature 40. The pole piece 26 includes an annular flux shunt portion 62 that extends down from the outer perimeter of a bottom surface of the pole piece 26. The pole piece 26 and the flux shunt portion 62 are a single piece of metal. A washer 68 is positioned with the air gap 60 to further control the air gap spacing. A cylindrical flux tube 64 extends into an opening in the bobbin 32, as shown, and is positioned between the armature 40 and the coil 30. The flux tube 64 includes an annular flange 66 that is mounted between the can 16 and the mounting member 18 so that the crimped tabs 22 rigidly secure both the can 16 and the flux tube 64 to the valve body 20. In one embodiment, the flux tube 64 is also made of a magnetic steel, and is formed by a deep drawn process to reduce costs.

When the coil 30 is energized, the magnetic flux lines generated by the coil 30 enter the can 16 and travel into the pole piece 26. The magnetic flux lines then travel across the gap 60 and enter the armature 40. Some of the magnetic flux lines enter the armature 40 through the flux shunt portion 62. The magnetic flux lines travel down the armature 40 and cross the bobbin 32 to enter the flux tube 64. The magnetic flux lines travel through the flux tube 64 to return to the can 16 to complete the magnetic path. The magnetic flux lines across the gap 60 cause the armature 40 to be attracted to the pole piece 26, thus causing the armature 40 to move upwards towards the pole piece 26 against the bias of the spring 52.

When the coil 30 is energized, the armature 40 is attracted to the pole piece 26 against the bias of the spring 52 such that the air gap 60 narrows and the flux shunt portion 62 encloses a top portion of the armature 40. As the armature 40 moves towards the pole piece 26, the magnetic flux lines become more radially oriented relative to the armature 40 because of the flux shunt portion 62. This linearizes the magnetic force gain and slows the armature 40. In other words, the flux shunt portion 62 directs some of the flux transfer across the air gap 60 to a more radial direction which becomes more radial as the armature 40 moves upward. This change in flux transfer direction weakens the magnetic force when the armature 40 is close to the pole piece 26, but strengthens the magnetic force at longer strokes. This has the effect of linearizing and reducing the magnetic gain of the valve 10 for the usable distance of the armature stroke. This reduced magnetic gain allows the use of a much lower grade spring 52. The lower force gains result in less pressure sensitivity to calibration, and therefore more accurate calibrations. By threadably adjusting the pole piece 26 relative to the can 16, the magnetic attraction between the pole piece 26, the flux shunt portion 62 and the armature 40 can be adjusted for calibration in different systems.

The valve body 20 defines an internal bore 70 extending through the hydraulic portion 14. A spool valve 72 is positioned within the bore 70 and is axially movable therein. The spool valve 72 defines an axial spool valve chamber 74 extending the length of the spool valve 72. An upper end of the chamber 74 is in fluid communication with the chamber 70, and an upper end of the chamber 70 is sealed by the seal member 44 of the armature 40. The seal member 44 is seated against an annular seat portion 76 of the valve body 20. When the coil 30 is energized and the armature 40 moves upward towards the pole piece 26, the seal member 44 moves away from the seat portion 76 so that the chamber 70 is in fluid communication with an exhaust cavity 78. The exhaust cavity 78 is in communication with an annular exhaust port 80 through the mounting portion 18. A diaphragm 84 is positioned at an upper location in the exhaust cavity 78 and is connected to the mounting member 18 and the seal member 44. The diaphragm 84 prevents hydraulic fluid from entering the magnetic portion 12, and is made of a suitable flexible material, such as silicon, that stands up to the rigors of the hydraulic environment, and does not deteriorate from hydraulic fluid.

A mounting bracket (not shown) is used to mount the valve 10 to a main module casting (not shown) to secure the solenoid valve 10 within the transmission. The lower end of the hydraulic portion 14 is inserted into the main module casting. A pair of O-rings 86 seal the valve 10 within the casting. In one embodiment, the main module casting includes other solenoid valves, stepper motors, hydraulic components, etc. used in the control of an automatic vehicle transmission, as would be well understood to those skilled in the art.

The valve body 20 further includes a supply port 92, a control port 94 and an exhaust port 96, all in fluid communication with the chamber 70. A filter 88, held in position by a cover 90, filters hydraulic fluid entering the supply port 92 and the control port 94. The spool-valve 72 includes an upper land 98, a lower land 100, and a narrow body portion 102 positioned between and connecting the upper land 98 and the lower land 100. The body portion 102 and the lands 98 and 100 define a control chamber 104 within the valve chamber 70, that is in fluid communication with the control port 94. In the position as shown, the upper land 98 covers the exhaust port 96 and the lower land 100 covers the supply port 92. A small feed orifice 106 is in fluid communication with the supply port 92 and the spool valve chamber 74. The valve body 20 includes a lower end cap 110. A lower chamber 112 of the valve body chamber 70 is defined between the spool valve 72 and the end cap 110. A spool valve spring 114 is positioned within the lower chamber 112 so that it contacts a lower end of the spool valve 72 and the end cap 110, and applies an upward bias on the spool valve 72 towards the magnetic portion 12. A feedback orifice 116 is in fluid communication with the control chamber 104 and the lower chamber 112.

When the control valve 10 is in a rest condition where no pressure is applied at any of the ports 92, 94 and 96 and the coil 30 is not energized, the valve spring 114 forces the spool valve 72 up until it contacts a bottom surface of the seat portion 76, and the armature spring 52 forces the armature 40 downwards so that the seal member 84 contacts a top surface of the seat portion 76. For this position of the spool valve 72, the exhaust port 96 is in fluid communication with the control chamber 104 and the control port 94. In operation, hydraulic fluid at a supply pressure $P_S$ for example 120 psi, is applied to the supply port 92. The hydraulic fluid at the supply pressure $P_S$ flows into the chamber 74 through the feed orifice 106. As the pressure in the chamber 74 increases, the spool valve 72 moves downward against the bias of the spring 114, closing off the exhaust port 96 from the control port 94 by the upper land 98. As the spool valve 72 continues to move down against the bias of the spring 114, the pressure in the lower chamber 112 increases. This causes the pressure in the control chamber 104 to increase through the feedback orifice 116, thus increasing the pressure at the control port 94.

When the pressure in the chamber 74 reaches a predetermined value as set by the armature spring 58, the pressure in the chamber 74 causes the armature 40 to move upwards to allow fluid within the chamber 74 to leak out through the exhaust port 80. By leaking pressure into the exhaust cavity 78, the spool valve 72 will be maintained at an equilibrium position within the chamber 70, and thus the control port pressure $P_C$ will be maintained at a constant value. In this equilibrium state, the valve 10 is relatively insensitive to fluctuations from vibrations and the like. By energizing the coil 30, the armature 40 is moved upward against the bias of the spring 52, and the pressure in the chamber 74 is reduced from an increased flow of fluid through the exhaust port 80. As the pressure in the chamber 74 decreases, the spool valve 72 will begin to rise with the bias of the spring 114 until the land 98 opens the exhaust port 96, and the pressure at the control port 94 is reduced to the exhaust port pressure. Because the feed orifice 106 is so small, the pressure in the chamber 74 cannot be increased fast enough from loss of fluid through the exhaust port 80 to effect the control pressure.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

We claim:

1. A solenoid control valve comprising:

a housing defining an internal chamber therein;

an electromagnetic coil wound on a bobbin and coaxially mounted within the housing relative to the internal chamber;

a movable armature positioned within the bobbin in the internal chamber and having a first end and a second end;

an armature spring in contact with the first end of the armature, said armature spring biasing the armature to a first position within the internal chamber and said armature being movable from the first position to a second position against the bias of the spring upon energizing of the electromagnetic coil;

a pole piece mounted to the housing and positioned adjacent to the first end of the armature and defining an air gap therebetween, said pole piece including a flux shunt piece being an annular flange extending towards the armature, said flux shunt piece causing electromagnetic field lines from the coil to extend radially from the armature when the electromagnetic coil is energized so as to weaken the magnetic force on the armature when the armature moves toward the pole piece to the second position;

a deep drawn flux tube secured to the bobbin and the housing and acting to define the electromagnetic field lines from the electrical magnetic coil, said flux tube including an annular flange extending around a bottom portion of the tube; and a valve body assembly including a supply port, an exhaust port and a control port, said valve body assembly including a central bore axially aligned with the armature and in fluid communication with the supply port, exhaust port, and the control port, said valve body assembly including a spool valve disposed within the central bore, said valve body assembly further including a spool valve spring that biases the spool valve towards the armature, said flux tube and said housing being connected to the valve body assembly by a plurality of crimped tabs, said annular flange being positioned between the housing and the valve body assembly and said crimped tabs extending from the housing over the flange and being crimped to the valve body assembly.

2. The control valve according to claim 1 wherein the first end of the armature is positioned within an opening defined by the flux shunt piece when the armature is in the second position.

3. The control valve according to claim 1 wherein the pole piece is threadably connected to the housing so as to control the distance of the air gap between the pole piece and the armature.

4. The control valve according to claim 1 wherein the pole piece and the flux shunt piece are a single member fabricated from a piece of metal.

5. The control valve according to claim 1 wherein the bobbin is a molded plastic member.

6. The control valve according to claim 1 wherein the valve body assembly includes an opening in fluid communication with the central bore and said spool valve includes a central chamber in fluid communication with the central bore of the valve body assembly, said second end of the armature seating against the valve body assembly when the armature is in the first position to seal the central bore.

7. The control valve according to claim 6 wherein the supply port is in fluid communication with the central chamber of the spool valve so that the spool valve moves away from the electromagnetic coil against the bias of the valve spring when a source pressure is applied to the supply port.

8. The control valve according to claim 1 wherein the control valve is a control valve used in the transmission of a vehicle.

9. A solenoid control valve comprising:

a housing defining an internal chamber therein;

an electromagnetic coil wound on a bobbin and coaxially mounted within the housing relative to the internal chamber;

a movable armature positioned within the internal chamber and having a first end and a second end, said armature being movable between a first position and a second position;

a flux tube secured to the bobbin and acting to define the electromagnetic field lines from the electromagnetic coil, said flux tube being a deep drawn metal member and including an annular flange extending around a bottom portion of the flux tube; and a valve body assembly including a valve body having a central bore axially aligned with the armature, said valve body defining a supply port, an exhaust port and a control port in fluid communication with the central bore, said valve body assembly further including a spool valve disposed within the central bore and a spool valve spring, said spool valve spring biasing the spool valve towards the armature, said flux tube and housing being connected to the valve body by a series of crimped tabs, said annular flange being positioned between the housing and the valve body and said crimped tabs extending from the housing over the flange and being crimped to the valve body.

10. The control valve according to claim 9 further comprising a pole piece mounted to the housing and positioned adjacent to the first end of the armature and defining an air gap therebetween, said pole piece including a flux shunt piece being an annular flange extending towards the armature, said flux shunt piece causing the electromagnetic field lines from the coil to extend radially from the armature when the electromagnetic coil is energized so as to weaken the magnetic force on the armature when the armature moves towards the pole piece to the second position.

11. The control valve according to claim 10 wherein the pole piece is threadably connected to the housing so as to control the distance of the air gap between the pole piece and the armature.

12. The control valve according to claim 10 wherein the pole piece and the flux shunt piece are a single member fabricated from a piece of metal.

13. A solenoid control valve for controlling a fluid pressure in a vehicle transmission, said control valve comprising:

a housing defining an internal chamber therein;

an electromagnetic coil wound on a bobbin and coaxially mounted within the housing relative to the internal chamber;

a movable armature positioned within the bobbin in the internal chamber and having a first end and a second end;

an armature spring in contact with the first end of the armature, said armature spring biasing the armature to a first position within the internal chamber and said armature being movable from the first position to a second position against the bias of the spring when the electromagnetic coil is energized;

a pole piece threadably mounted to the housing and positioned adjacent to the first end of the armature and defining an air gap therebetween, said pole piece including a flux shunt piece being an annular flange extending towards the armature, said pole piece being threadably connected to the housing so as to control the distance of the air gap between the pole piece and the armature, said flux shunt piece causing electromagnetic field lines from the coil to extend radially from the armature when the electromagnetic coil is energized so as to weaken the magnetic force on the armature when the armature moves towards the pole piece to the second position;

a deep drawn flux tube secured to the bobbin and the housing, and acting to define the electromagnetic field lines from the electromagnetic coil, said flux tube including an annular flange extending around a bottom portion of the tube; and a valve body assembly including a valve body having a central bore axially aligned with the armature, said valve body defining a supply port, an exhaust port and a control port in fluid communication with the central bore, said valve body assembly further including a spool valve and a spool valve spring disposed within the central bore, said spool valve spring biasing the spool valve towards the armature, said spool valve being axially positioned within the central bore, said flux tube and said housing being connected to the valve body at a common location by a plurality of crimped tabs, said annular flange being positioned between the housing and the valve body and said crimped tabs extending from the housing over the flange and being crimped to the valve body.

14. The control valve according to claim 13 wherein the first end of the armature is positioned within an opening defined by the flux shunt piece when the armature is in the second position.

15. The control valve according to claim 13 wherein the pole piece and the flux shunt piece are a single member fabricated from a piece of metal.

* * * * *